United States Patent [19]
Jacquart

[11] 3,761,841

[45] Sept. 25, 1973

[54] SERVOBALANCED DELTA MODULATOR

[75] Inventor: Christian Augustin Jacquart, Carros, France

[73] Assignee: International Business Machines Corporation, Armonk, N.Y.

[22] Filed: Feb. 15, 1972

[21] Appl. No.: 226,473

[30] Foreign Application Priority Data

Feb. 25, 1971 France .............................. 7107550

[52] U.S. Cl. .............................. 332/11 D, 325/38 B
[51] Int. Cl. .............................. H03k 13/22
[58] Field of Search .............................. 332/11 R, 11 D; 325/38 R, 38 B

[56] References Cited

UNITED STATES PATENTS

| | | | |
|---|---|---|---|
| 3,461,244 | 8/1969 | Brolin | 324/38 B X |
| 3,609,551 | 9/1971 | Brown | 332/11 D |
| 3,699,566 | 10/1972 | Schindler | 325/38 B X |
| 3,582,784 | 6/1971 | Gaunt | 332/11 D |
| 3,103,629 | 9/1963 | Damen et al. | 325/38 R |

*Primary Examiner*—Alfred L. Brody
*Attorney*—Robert B. Brodie et al.

[57] ABSTRACT

Idle channel noise is reduced in a delta modulator encoding at a rate $1/T$ by sampling the modulator output at the same rate $1/T$ but time delayed by $\tau$ seconds and by modifying the feedback integrator output by an amount $\Delta I \leq I \sqrt{2T/\tau 2}$ where $I$ is the amount of the integrator incrementing step and $1/\tau_2$ is the upper frequency cutoff of the modifying means, $\tau_2$ being greater than $T$.

1 Claim, 5 Drawing Figures

PATENTED SEP 25 1973

3,761,841

SHEET 2 OF 2

SERVOBALANCED DELTA MODULATOR

BACKGROUND OF THE INVENTION

This invention relates to coded signal processing using modulation called delta modulation, and more particularly, a coding device or delta modulator.

Among the many ways of representing analog signals in the digital mode, delta modulation shows the advantage of enabling the use of the simplest coding and decoding circuits. Generally, the delta modulation is a binary code modulation including only one bit. The signal supplied by the modulator represents, through binary pulses or bits, the sign of the difference between the value of the analog signal sampling time $t$, *and its value at sampling time* $t-\tau$, $\tau$ showing the timing of these sampling times. This bit is equal to 1 if the value of the analog signal at the time $t$ exceeds the value taken by the signal at time $t-\tau$, and to 0 in the other case. In the matter of decoding, the approximate signal is obtained by integration of the series of bits supplied by the modulator.

The various bits supply, by integration, a sequence of steps appearing as elementary rises which enable to approximate the analog signal. This decoding is carried out on one hand at the receiving station, and on the other hand, in the modulator itself, where it enables the reconstruction of the signal at sampling time $t-\tau$ in order to obtain the difference indicated above.

A problem raised on the implementation of this modulation principle concerns the presence of a noise in case of no input signal.

Several articles written recently relate to this problem, and in particular, the article entitled "Idle Channel Noise of Delta Modulation", of P. P. Wang, published in the IEEE Transactions on Communications Technology, Vol. com-16, No. 5, October, 1968, at pages 737 to 742.

Briefly, the noise currently called "idle noise" is due to the fact that the currents defining the positive and negative steps are not exactly equal. Should they be equal, the modulation in the absence of signals, would consist of a sequence of regularly alternating positive and negative steps. In fact, they are not equal, and it appears a small drift which causes, from time to time, a sequence of two positive or negative steps to appear, the repetition of which induces a background noise which, in the audio frequency applications, is exactly situated in the audio frequency band and supplies erroneous frequencies.

A previous solution to cancel this unbalance consists in supplying a single current source from which the currents required for obtaining positive or negative steps are shunted by using a diode bridge so that the currents defining the positive and negative steps are equal. However, there always exists a small error due to the input current of the comparator delivering a difference signal, and due to the logic circuit delay. Another disadvantage of this solution consists in the fact that the single current source should be as accurate as possible. In fact, a such implenentation uses the analog technique and cannot be easily embodied and so, is expensive. Parenthetically, the problem of idle noise occurring in pulse code modulators is treated in U.S. Pat. No. 3,103,629 issued to T. C. Damen on Sept. 10, 1963. In this case, a summing node is coupled to an analog input signal source, a reference signal source, and an integrator for driving an encoding circuit. The current flow is periodically interrupted for measuring the current drift deviation and readjusting the node to make an effective zero level.

SUMMARY OF THE INVENTION

An object of this invention is to provide an improved delta modulator without any idle noise.

Another object of this invention is to provide an improved delta modulator without any idle noise and which does not require the use of any accurate element, and of inexpensive manufacture.

The foregoing objects are satisfied by an embodiment of a feedback loop delta modulator in which a correction loop is added. This loop cancels the drift created by the unbalanced steps. Furthermore, this loop includes a trigger which reads the result of the comparison supplied by the conventional delta modulator comparator at times between the delta modulator sampling times. As the drift is positive or negative, this trigger supplies bits 1 or 0, which integrated by a correction integrator, supply a voltage which corrects the intensity of the currents supplied to the local integrator to balance the steps.

DESCRIPTION OF THE PREFERRED EMBODIMENT

Figure 1:
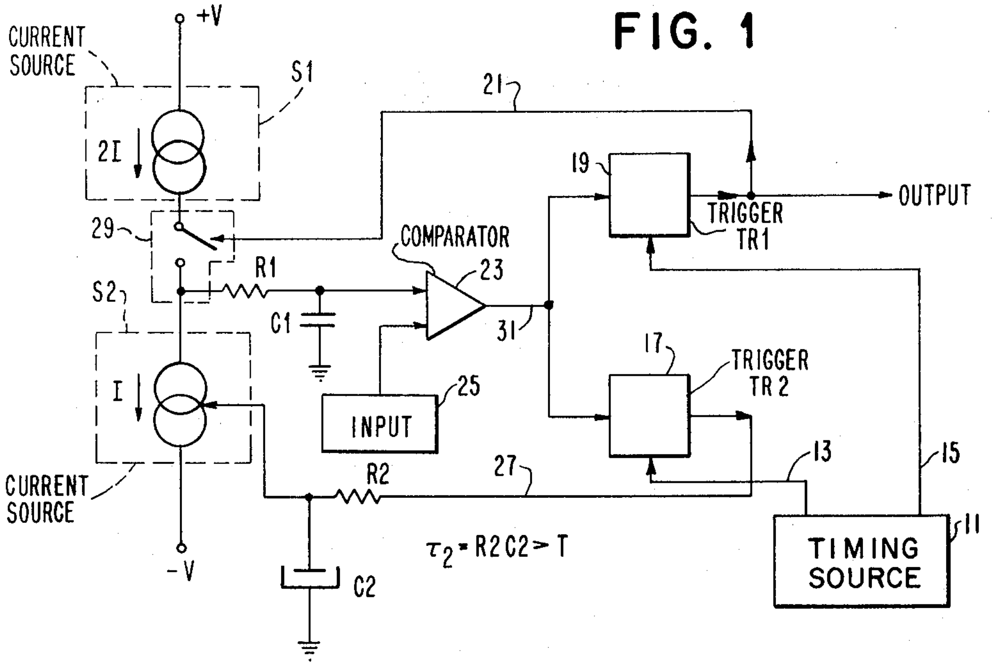
FIG. 1 is a schematic diagram of the delta modulator of this invention.

FIG. 1 is a schematic diagram of the delta modulator of this invention. The input signal to be coded is applied to a comparator C, which also receives the output of the local integrator formed in this example by resistors R1 and capacitor C1. The output of this comparator is read on one hand, by a first pulse generator which is, in this example, trigger TR1 at times defined by timing pulses T1, and on the other hand, by a second pulse generator which is, in this example, trigger TR2 at times defined by timing pulses T2. The pulses provided by trigger TR1 constitute the coded signal. The output of trigger TR1 is applied to a switch which controls the application of $I$ and $-I$ current steps to the local integrator. In this example, the $I$ and $-I$ current steps are obtained by combining the currents supplied by two current sources S1 and S2, constituting a current generator and the rated amplitudes of which are $2I$ and $I$ respectively.

The output of trigger TR2 is applied to a correction integrator, formed in this example, by resistor R2 and capacitor C2. The voltage supplied by this integrator controls a variation of the amplitude of the current supplied by current source S2 to compensate for a current drift in the steps supplied to the local integrator.

The operation of the device will be described in the most interesting case, i.e., without input signal. It should be understood that the device operates in the presence of an input signal to be coded, but in this case, its operation is identical to the operation of the delta modulators known in the prior art, and will not be described in detail in this document.

Figure 2A:
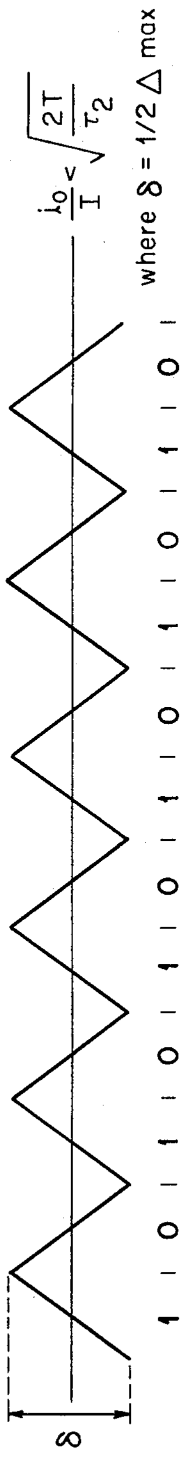
FIG. 2*a* shows the ramps provided by an ideal delta modulator.
Figure 2B:
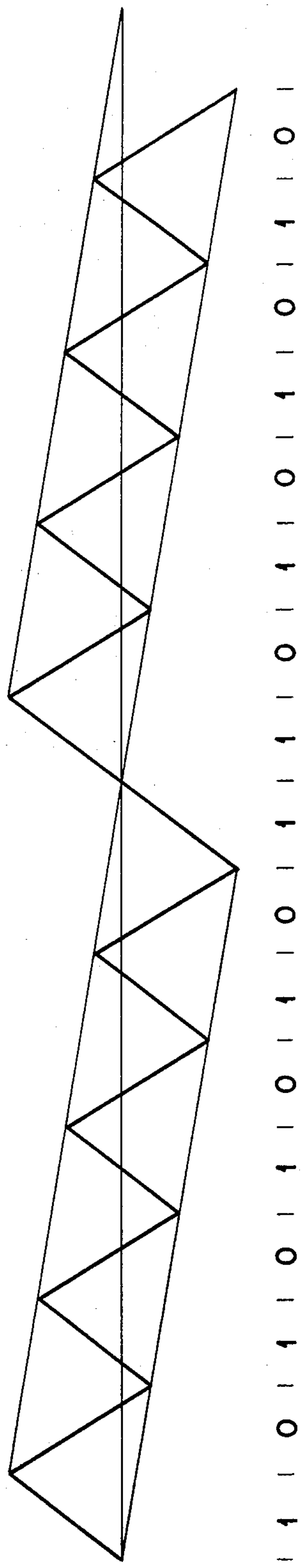
FIG. 2*b* shows the ramps provided by a delta modulator of the prior art.

An ideal delta modulator without input signals, emits a sequence of binary 1 and 0, alternatively, the output of the local and receiving integrators providing a sequence of ramps perfectly centered on the origin, the positive and negative steps being perfectly equal, as shown in FIG. 2*a*. In fact, in the conventional delta modulators, the steps being not exactly equal, it appears a time drift which causes a sequence of two bits 1 or bits 0 according to the drift direction to appear. This sequence of two identical bits appears at regular intervals, and causes interfering complex frequencies to appear. Such a drift is shown in FIG. 2*b*.

The correction loop constituted by trigger TR2 and the correction integrator enables to overcome this disadvantage.

Trigger TR2 reads the result of the comparison at times defined by timing pulses T2. These pulses appear at the same frequency as timing pulses T1, but are phase shifted with respect to the latters, and more particularly, are centrally time-located between pulses T1. Without drift, the voltage rises provided by the local integrator are perfectly centered and at the times trigger TR2 is read, the voltage provided by the comparator is null. Trigger TR2 provides a sequence of bits 1 and 0, i.e., levels +1 and −1 which, integrated by the correction integrator, provide a null correction voltage, so that the correction loop does not intervene.

If a drift appears, the result of the comparison at times T2 will set trigger TR2 in condition 1 or 0 according to the drift direction. The bits supplied by trigger TR2 are integrated by the correction integrator and the voltage delivered by this integrator is used to vary the amplitude of the current supplied by current source S2 to compensate this drift. Time constant $\tau 2$ of the correction integrator, $\tau 2 = R2\ C2$ is selected so that the normal operation of the delta modulator is not disturbed. If $T$ is the period of timing pulses T1 and T2, time constant $\tau 2$ is selected larger than $T$.

In addition, the selection of time constant $\tau 2$ is guided by the compensation wanted for the drift.

If $\delta$ is the step of the delta modulator (see FIG. 2*a*) the drift should never exceed one-half $\delta$, since in the other case, a sequence of two identical bits would appear in the alternating series of bits 1 and 0 supplied by the delta modulator without input signal.

If one-half $\delta$ is selected as the maximum value of the drift, the relative current error should verify the following inequality:

$$\Delta I/I < \sqrt{2\ T/\tau 2}$$

where $\Delta I$ is the current variation due to the drift and $I$ is the rated current of the step.

Figure 3A:
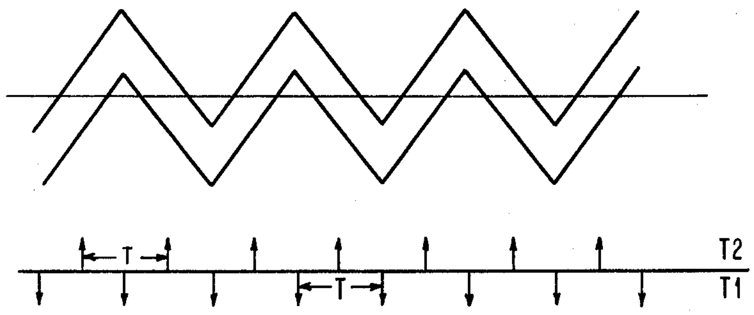
FIGS. 3*a* and 3*b* show the rises provided by the delta modulator of this invention, in two different cases of operation.

The sequence of ramps supplied by the local integrator shows a balance condition which is represented in FIG. 3*a* in the cases of a positive drift and of a negative drift.

The value of the coding threshold which is of one-half $\delta$ in the operation which has just been described, can be lowered by adjusting the phase of pulses T2 with respect to pulses T1.

Figure 3B:
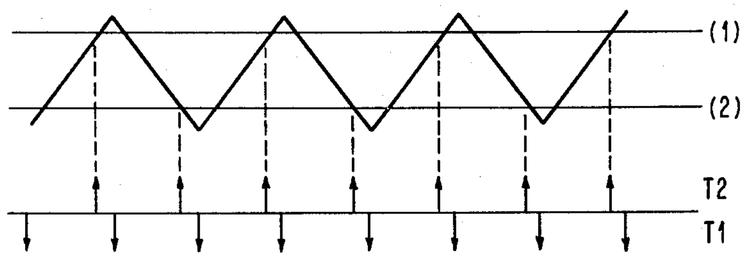

If pulses T2 are closer to pulses T1, as shown in FIG. 3b, the rise sequence stabilizes about the levels referenced (1) and (2) in FIG. 3*b*, corresponding to the reading times of triggers TR2, and then, the coding threshold is lower than one-half $\delta$.

Up to now, the delta modulator has been involved, but it is obvious for those skilled in the art that the invention can be applied to the sigma-delta modulators, the sigma-delta modulation being a variant of the delta modulation. The application of the invention to sigma-delta modulators will be performed by only adding the correction loop to the conventional sigma-delta modulator.

While the invention has been particularly shown and described with reference to several embodiments, it will be understood by those skilled in the art that various changes in form and detail may be made therein without departing from the spirit and scope of the invention.

What is claimed is:

1. In a delta modulator having:

a clock (11) for generating sampling signals every $T$ seconds and every $T$ seconds but phase delayed by $\tau$ seconds;

a first integrator (R1, C1);

an input signal source (25);

a current source (S1, S2) connectable to the first integrator;

means (23) for generating a relative magnitude difference signal between the input signal source and the first integrator output;

means (31, 19, 21, 29) including the current source and a first digitizer (19) responsive to the difference signal and operable by the clock every $T$ seconds for altering the first integrator output by a fixed magnitude $I$ in a direction tending to minimize the difference signal, the polarity of the fixed magnitude corresponding to the binary sign of the first digitizer output;

compensation means (31, 17, 13, 27, R2, C2) including a second digitizer (17) also responsive to the difference signal and operable by the clock every $T$ seconds but phase delayed by $\tau$ seconds; said compensation means further comprising: a second integrator (R2, C2) having a time constant $\tau_2$, $\tau_2 > T$; the second integrator being coupled to the second digitizer and being incremented in the same direction as the binary signal therefrom; and means (S2) responsive to the second integrator output for varying the first integrator output by an amount $\Delta I \leq I \sqrt{2T/\tau_2}$, whereby the limits between which the magnitude drift occurs (FIGS. 3*a*, 3*b*) varies inversely as the phase delay $\tau$ between the sampling signals.

* * * * *